United States Patent [19]

Breckwoldt et al.

[11] Patent Number: 5,294,702
[45] Date of Patent: Mar. 15, 1994

[54] WATER-SOLUBLE POLYMERIZABLE 3-ALLYLOXY-2-HYDROXYPROPYLETHER OF CELLULOSE

[75] Inventors: Jörn Breckwoldt, Rotenburg; Klaus Szablikowski, Walsrode, both of Fed. Rep. of Germany

[73] Assignee: Wolff Walsrode AG, Walsrode, Fed. Rep. of Germany

[21] Appl. No.: 955,636

[22] Filed: Oct. 2, 1992

[30] Foreign Application Priority Data

Oct. 11, 1991 [DE] Fed. Rep. of Germany ....... 4133677

[51] Int. Cl.$^5$ ............................................. C08B 11/193
[52] U.S. Cl. .......................................... 536/84; 536/85; 536/90; 536/91; 536/93; 536/95
[58] Field of Search ....................... 536/84, 85, 90, 91, 536/93, 95

[56] References Cited

U.S. PATENT DOCUMENTS 3,829,290 8/1974 Berni et al. ............................ 536/93
4,650,863 3/1987 Felcht et al. ........................... 536/91

FOREIGN PATENT DOCUMENTS 1418271 6/1959 Fed. Rep. of Germany .
1418924 12/1968 Fed. Rep. of Germany .

OTHER PUBLICATIONS

Die Makromolekulare Chemie Bd. 177, Nr. 5, 1976, CH Seiten 1301–1329.
Chemical Abstracts, vol. 117, No. 10, Columbus, Ohio, US; abstract No. 92505d.

Primary Examiner—Nathan M. Nutter
Attorney, Agent, or Firm—Sprung Horn Kramer & Woods

[57] ABSTRACT

This invention relates to water-soluble polymerisable 3-allyloxy-2-hydroxypropylethers of cellulose and to a process for their preparation.

4 Claims, No Drawings

WATER-SOLUBLE POLYMERIZABLE 3-ALLYLOXY-2-HYDROXYPROPYLETHER OF CELLULOSE

This invention relates to water-soluble polymerisable 3-allyloxy-2-hydroxypropylethers of cellulose.

Cellulose ethers and cellulose mixed ethers have opened up the possibility of numerous fields of application over the years. Water-soluble cellulose ethers have been introduced in numerous fields of application. Each application requires a specific solution which in many cases entails an adaptation to the product.

In spite of the possibility of influencing the properties of the cellulose derivatives by varying the substituents in their chemical nature, level and distribution and the viscosity, the conventional types do not entirely satisfy all requirements. As example may be mentioned the problem of resistance to wiping and scrubbing of dispersion dyes, which has still not been satisfactorily solved.

To overcome these disadvantages and provide new possibilities of application for cellulose ethers, 3-allyloxy-2-hydroxypropylethers of cellulose whose active centres can be used in subsequent reactions have been synthesized. The double bonds may be used for addition reactions, including both ionic reactions and radical reactions.

A few examples of polymerisable cellulose ethers have been described in the literature. The works are concentrated on the reaction with allyl halides on account of their ease of accessibility. The following are specific examples of known water-soluble unsaturated cellulose ethers:

1. Allyl ethyl cellulose (U.S. Pat. No. 2,891,056)
    This product is insufficiently soluble in water. Products having a degree of substitution DS(OA) of from 0.1–0.5 will only dissolve in cold water (T<3° C.). In compounds which dissolve at room temperature, the degree of substitution of the unsaturated group is insufficient for polymerisation.
2. Allyl hydroxyethyl cellulose (DE-OS 1 418 271)
    A water-soluble polymerisable cellulose mixed ether (DS [OA]: 0.2–0.7) is obtained in a heterogeneous phase by the action of allyl bromide on a hydroxyethyl cellulose (MS: 1). The high solubility in water is a disadvantage for the purification of the products. This compound has no thermal flocculation point and can only be purified with a methanol/water mixture; a large proportion of the product is washed out in the process.
3. Allyl carboxymethyl cellulose (DE-PS 1 077 651)
    This cellulose ether produced by a two-stage process is polymerisable only to a slight extent due to its very low degree of allyl substitution (DS [OA-]<0.1).
4. Methyl hydroxyethyl allyl cellulose (U.S. Pat. No. 3,251,825)
    A multistage process of preparation is describe which leads to water-soluble, polymerisable products only at relatively high degrees of molar substitution or substitution of the hydroxyethyl group (from 0.6 to 1.4).

Common to all these processes is the low chemical yield of allyl bromide. It does not exceed 30% in any of the processes. Moreover, allyl bromide is very expensive. Although allyl chloride is substantially less expensive, it is also less reactive. Both halides are highly corrosive and are suspected of being carcinogenic (high investment costs).

Allyl glycidyl ether is a reactive unsaturated compound which should react readily under the usual reaction conditions of cellulose chemistry. Indications are given in the literature concerning the etherification of cellulose with allyl glycidyl ether in connection with the finishing of textiles to improve their dye absorption and crease resistance (see J B. McKelvey et al, Textile Research Journal, 29, 918 [1959]; D. M. Soignet et al, Journal Applied Polymer Science 11, 1155 [1967]).

A fundamental work by Y. Tanaka (Makromol. Chem. 177, 1301 [1976]) concerning the reactivity of epoxides with cellulose mentions allyl glycidyl ethers among others but makes no mentioned of water-soluble products.

It was an object of the present invention to provide water-soluble polymerisable cellulose ethers.

It was a further object of this invention to provide a process of preparation resulting in high chemical yields and using non-toxic reagents.

The invention relates to polymerisable water-soluble cellulose mixed ethers, characterised in that the molar degree of substitution MS with 3-allyloxy-2-hydroxypropyl groups is from 0.05 to 0.5. The cellulose mixed ethers may be synthesised from, for example, methyl cellulose, hydroxyethyl cellulose, hydroxypropyl cellulose, mixed cellulose ethers such as methyl hydroxyethyl cellulose, methyl hydroxypropyl cellulose, ethyl hydroxyethyl cellulose, hydroxyethyl and hydroxypropyl cellulose, sulphoethyl cellulose, sulphoethyl carboxymethyl cellulose, methyl sulphoethyl cellulose, hydroxyethyl sulphoethyl cellulose, dihydroxypropyl cellulose, dihydroxypropyl hydroxyethyl cellulose, dihydroxypropyl carboxymethyl cellulose, carboxymethyl cellulose, and esters and salts thereof with sodium, potassium, calcium and ammonium ions and carboxymethyl hydroxyethyl cellulose.

Methyl hydroxyethyl cellulose, methyl hydroxypropyl cellulose, hydroxyethyl cellulose, hydroxypropyl cellulose and carboxymethyl cellulose are preferred.

In a preferred embodiment, the compounds are soluble to an extent of at least 2 g per 100 g of water at 25° C. to form a clear solution.

It lies in the nature of polymers that a saturated solution of cellulose ethers cannot be prepared since for each viscosity type an increase in concentration is accompanied by an increase in solution viscosity to the point at which technical processibility becomes impossible.

The invention further relates to a process for the preparation of the 3-allyloxy-2-hydroxypropyl cellulose ethers according to the invention by
   a) formation of an alkali metal cellulose by the reaction of cellulose with alkali;
   b) reaction of the alkali metal cellulose with allyl glycidyl ether, optionally in the presence of other etherifying agents which react under catalysis with bases, and
   c) optionally alkylation after termination of the allyloxy-2-hydroxypropylation after addition of a suitable alkylating agent.

Preferred etherifying reagents which react in the presence of basic catalysts include ethylene oxide, propylene oxide, glycidol and the sodium salt of vinyl sulphonic acid.

By alkylating agents are meant the methylation, ethylation and carboxymethylation compounds conventionally used in cellulose ether chemistry.

Ground celluloses such as linters from bleaching or wood cellulose are used as starting materials for the process according to the invention. The viscosity stages of the products may be adjusted by selecting celluloses which have the appropriate average degree of polymerisation. Low viscosity products may be obtained by using celluloses which have been oxidatively degraded by the usual processes.

Alkalisation of the celluloses and their subsequent etherification may be carried out in the presence of organic solvents in order to avoid local overheating and produce uniformly etherified products. Lower alcohols preferably containing from 2–4 carbon atoms per molecule and ethers preferably having 2–4 carbon atoms per molecule or mixtures of these solvents are suitable organic solvents for this purpose. The cellulose is sprayed with sodium hydroxide solution for alkalization. The concentration of this solution should be from 20–50% by weight, preferably from 40–50% by weight, and the quantity of alkalizing solution used should not be less than 1.6 mol of sodium hydroxide per mol of cellulose. According to the invention, the reagent which reacts in the presence of basic catalysts and the allyl glycidyl ether are added either before the sodium hydroxide or after the phase of alkalization. For etherification, the reaction mixture is heated to temperatures of from 40–90° C., preferably from 50–70° C., and the temperature level is maintained until the reaction is complete. The reaction mixture is cooled before addition of the alkylating agent, preferably to temperatures below 50° C. The temperature is then again raised to 50–100° C., preferably from 70–90° C., and the alkylating reaction is carried out at this temperature within 1–5 hours, preferably 1.5–3 hours.

Purification of the crude products is carried out by the usual methods of cellulose ether chemistry. Ionic cellulose ethers and products produced exclusively with alkylene oxides are purified with aqueous methanol, preferably 70% methanol, or with aqueous acetone, preferably 80% acetone.

The alkylated non-ionic cellulose derivatives may be purified by washing with hot water as they have a thermal flocculation point.

In one particular embodiment of the process, the allyl glycidyl ether may be reacted in solution or dispersion with cellulose ethers which are already water-soluble, the cellulose ethers being preferably used in suspension as they form very highly viscous solutions which can tolerate only low solids contents and therefore require a large reaction space and complicated methods of working up. Suitable dispersing agents have the meaning indicated above. The cellulose ethers is generally introduced into the reaction vessel in a suitable medium and the allyl glycidyl ether is added as such or as a solution in a solvent after the phase of alkalization.

The reaction temperature is from 40–90° C., preferably from 50–70° C.

The reaction time is from 1–5 hours, preferably from 1.5–3 hours.

Purification of the crude products is carried out as described above in accordance with the nature of the substituents.

3-Allyloxy-2-hydroxypropyl cellulose mixed ethers having an 3-allyloxy-2-hydroxypropyl MS of from 0.05–0.5 form clear solutions in water and can easily be polymerised. The cellulose ethers prepared according to the invention also manifest good film formation. The films are transparent and highly flexible. Films of 3-allyloxy-2-hydroxypropyl cellulose mixed ethers may be rendered insoluble by cross-linking the double bond present. This may be initiated by UV light, which does not discolour the films. Thermal initiation is not possible.

In the 3-allyloxy-2-hydroxypropyl cellulose mixed ethers prepared according to the invention, double bonds have been introduced into the cellulose chain and can be used as reactive centres in subsequent reactions. The double bonds may be used for reactions of addition, i.e. both for ionic and for radical reactions.

Owing to their capacity for homo- and copolymerisation with unsaturated compounds, the 3-allyloxy-2-hydroxypropyl cellulose mixed ethers may be used for the production of lacquers, coatings and water-absorbent materials.

The 3-allyloxy-2-hydroxypropyl cellulose mixed ethers are particularly suitable for coating paper and other substrates as they can be homopolymerised by UV light without deleteriously affecting the transparency. The properties of the coatings may be varied by copolymerisation with vinyl monomers, in particular acrylates and/or methacrylates. Difficultly flammable coatings for paper and textiles may be produced by 1. a copolymerisation with alkenyl phosphorus compounds and
2. an addition of Si—H and P—H compounds to the double bond. This is of great interest for decorative purposes and theatre scenes.

The 3-allyloxy-2-hydroxypropyl cellulose mixed ethers prepared according to the invention may advantageously be used as thickeners in dispersion dyes. Due to their capacity for polymerisation, they improve the resistance to wiping and scrubbing.

The invention will now be described with the aid of the following Examples. The terms DS (Degree of Substitution) and MS (Degree of Molar Substitution) used for the cellulose ethers according to the invention have the usual meaning.

Each anhydroglucose unit in the cellulose molecule has three hydroxyl groups.

DS is the average number of hydroxyl groups/ anhydroglucose units substituted in the cellulose.

MS is the average number of mols of reactants/anhydroglucose units combined with the cellulose.

EXAMPLES

Example 1

Methyl-3-allyloxy-2-hydroxypropyl cellulose 121.5 g of finely ground wood cellulose are alkalized with 120 g of 50% sodium hydroxide solution for 60 minutes at room temperature in a 2-liter pressure autoclave which has been flushed with inert gas. 57 g of allylglycidyl ether are then added to the alkali metal cellulose. The temperature in the autoclave is raised to 80° C. After an etherification time of 2 hours, the reactor is cooled and 12 mol of methyl chloride per mol of cellulose are added. The reactor is then heated to 80° C. and the contents are methylated for 2 hours. After cooling, the product is washed with hot water and dried. The product obtained has the following degrees of substitution:

DS (OMe): 1.69
MS (AHP): 0.21.

The chemical yield based on the allyl glycidyl ether is 40%.

Example 2

Methyl hydroxypropyl-3-allyloxy-2-hydroxypropyl cellulose 121.5 g of finely ground wood cellulose are alkalized with 120 g of 50% sodium hydroxide solution for 60 minutes at room temperature in a 2-liter pressure autoclave which has been flushed with inert gas. 87 g of propylene oxide and 91 g of allyl glycidyl ether are then added to the alkali metal cellulose. The temperature in the autoclave is raised to 90° C. After an etherification time of one hour, the reactor is cooled and 12 mol of methyl chloride per mol of cellulose are introduced. The contents are then heated to 80° C. and methylated for 4 hours. After cooling, the product is washed with hot water and dried. It has the following degrees of substitution:
DS(OMe): 1.45
MS(HP): 1.3
MS(AHP): 0.3

Example 3

Methyl-3-allyloxy-2-hydroxypropyl hydroxyethyl cellulose 141.7 g of finely ground methyl hydroxyethyl cellulose are made up into a slurry with 3 liters of isopropanol containing 5% by weight of water in a 3-liter glass reactor which has been flushed with inert gas, 15 g of NaOH (pellets) are added and the reaction mixture is alkalized for one hour at room temperature. After the alkalization, 42.8 g of allyl glycidyl ether are added to the alkali metal cellulose. The temperature in the glass reactor is slowly raised to 70° C. and maintained at this level for 120 minutes. After the reactor has cooled down, the contents are neutralised with acetic acid and the product is washed with hot water. The cellulose ether obtained has the following degrees of substitution:
DS(OMe): 1.85
MS(HE): 0.45
MS(AHP): 0.18.

The chemical yield, based on allyl glycidyl ether, is 46%.

Example 4

Hydroxyethyl-3-allyloxy-2-hydroxypropyl cellulose 104 g of finely ground hydroxyethyl cellulose are made up into a slurry with 3 liters of isopropanol containing 5% by weight of water in a 3-liter glass reactor which has been flushed with inert gas. 15 g of NaOH (pellets) are added and the reaction mixture is alkalized at room temperature for one hour. After the alkalization, 42.8 g of allyl glycidyl ether are added to the alkali metal cellulose. The temperature in the glass reactor is slowly raised to 70° C. and maintained at this level for 120 minutes. After the reactor has cooled, the contents are neutralised with nitric acid, washed with 80% methanol and dried. The product obtained has the following degrees of substitution:
MS(HE): 2.5
MS(AHP): 0.26.

The chemical yield, based on allyl glycidyl ether, is 86%.

Example 5

Carboxymethyl-3-allyloxy-2-hydroxypropyl cellulose 173.7 g of finely ground carboxymethyl cellulose are made up into a slurry with 3 liters of isopropanol in a 3-liter glass reactor which has been flushed with inert gas, and 15 g of NaOH (pellets) are added and the reaction mixture is alkalized at room temperature for one hour. After the alkalization, 42.8 g of allylglycidyl ether are added to the alkali metal cellulose. The temperature in the glass reactor is slowly raised to 70° C. and maintained at this level for 120 minutes. After the reactor has cooled down, the contents are neutralised with acetic acid, washed with 70% methanol and dried. The carboxymethyl 3-allyloxy-2-hydroxypropyl cellulose obtained has the following degrees of substitution:
DS(CM): 0.87
MS(AHP): 0.2.

Comparison Example 1

Methyl hydroxyethyl allyl cellulose 121.5 g of finely ground wood cellulose are alkalized with 120 g of 50% sodium hydroxide solution at room temperature for 75 minutes in a 2-liter pressure autoclave which has been flushed with inert gas. 33 g of ethylene oxide and 28.6 g of allyl chloride are then added to the alkali metal cellulose. The temperature in the autoclave is raised to 55° C. After an etherification time of 3 hours, the reactor is cooled and 12 mol of methyl chloride per mol of cellulose are introduced. The reaction mixture is heated to 80° C. and methylated for 90 minutes. After cooling, the product is washed with hot water and dried. The methyl hydroxyethyl allyl cellulose obtained has the following degrees of substitution:
DS(OMe): 1.72
DS(OA): 0.18
MS(HE): 0.77.

The chemical yield, based on allyl chloride, is 35%.

Solubility

The cellulose ethers according to the invention dissolve in water to form a clear solution. To test the capacity for polymerisation, films were produced from the cellulose ethers according to the invention and then irradiated with UV light. The solubility of the irradiated film is an indication of the capacity for polymerisation. The films were produced by preparing a 5% solution of the cellulose ether in water. Films were then drawn out on glass plates by means of a manual casting device and these films were dried at 50° C. for one hour in a circulating air drying cupboard and withdrawn from the glass plate. The films are clear, flexible and soluble in water. When the films are exposed to UV irradiation, the unsaturated groups undergo cross-linking by homopolymerisation. The films then become insoluble in water.

The capacity of the 3-allyloxy-2-hydroxypropyl substituent for polymerisation is substantially better than that of the allyl substituent (see Table 1).

TABLE 1

Solubilities of the cellulose ethers according to the invention

| Product | DS (OMe) | MS (HE) | MS (AHP) | DS (OH) | $V_2$ (mPa.s) | Solubility in water Before polymerisation | Solubility in water After polymerisation |
|---|---|---|---|---|---|---|---|
| according to Example 3 | 1.85 | 0.45 | 0.18 | | 4,000 | + | − |
| according to Comparison Example 1 | 1.72 | 0.77 | | 0.18 | 10,869 | + | severe solubilization |
| according to Example 4 | | 2.5 | 0.26 | | | + | − |

+ = soluble
− = insoluble

The unsaturated cellulose ethers prepared according to the invention are superior to the product Natrosol Plus available on the market in their capacity to influence
* flow properties,
* storage stability,
* processibility and
* abrasion resistance of dispersion dyes (see Table 2).

TABLE 2

Technical assessment of the cellulose ethers according to the invention in their use properties

| Test method | MHEC + AGE according to Example 3 | Natrosol Plus | Dimension |
|---|---|---|---|
| Viscosity, aqueous Haake MV II, D:2.55s | 4,400 | 6,600 | mPa.s |
| Quantity used in the dye | 0.5 | 0.47 | % |
| Viscosity, dye, Haake MV II, D = 2.55s | 14,000 | 13,300 | mPa.s |
| Viscosity, dye, Stormer ASTM-D 562 | 128 | 128 | KU |
| Viscosity, dye, Haake PK 100, D = 10240s | 160 | 135 | mPa.s |

TABLE 2-continued

Technical assessment of the cellulose ethers according to the invention in their use properties

| Test method | MHEC + AGE according to Example 3 | Natrosol Plus | Dimension |
|---|---|---|---|
| Storage stability, dye, Haake MV II; D = 2.55s, 15 days/40° C. | 14,000 | 12,700 | mPa.s |
| Abrasion resistance, DIN 53778 T2 | 5,700 5,900* | 2,700 | cycles |
| Assessment of spread coated film | 2-3 | 4-5 | |

*) irradiated with UV light

We claim:

1. Water-soluble polymerisable 3-allyloxy-2-hydroxypropylether of cellulose.

2. 3-Allyloxy-2-hydroxypropylether of cellulose according to claim 1, characterised in that the molar degree of substitution (MS) with 3-allyloxy-2-hydroxypropyl groups is from 0.05–0.5.

3. A process for the preparation of 3-allyloxy-2-hydroxypropylethers of cellulose according to claim 1, characterised in that cellulose is reacted with alkalies to form alkali metal cellulose and the alkali metal cellulose is then reacted with allyl glycidyl ether.

4. 3-Allyloxy-2-hydroxypropylether of cellulose according to claim 1, characterized in that the molar degree of substitution (MS) with 3-allyloxy-2-hydroxypropyl groups is at least about 0.18.

* * * * *